May 3, 1960 M. J. DAVIES 2,935,310
MACHINES FOR CUTTING ROOMS IN MINES
Filed July 25, 1957 3 Sheets-Sheet 1

Inventor
Maynard John Davies
by Stevens, Davis, Miller & Mosher
his attorneys

Inventor
Maynard John Davies
by Stevens, Davis, Miller & Mosher
his attorneys

May 3, 1960 M. J. DAVIES 2,935,310
MACHINES FOR CUTTING ROOMS IN MINES
Filed July 25, 1957 3 Sheets-Sheet 3

United States Patent Office 2,935,310
Patented May 3, 1960

2,935,310

MACHINES FOR CUTTING ROOMS IN MINES

Maynard John Davies, Porth, South Wales, assignor to Coal Industry (Patents) Limited, London, England, a British company Application July 25, 1957, Serial No. 674,059

Claims priority, application Great Britain August 2, 1956

1 Claim. (Cl. 262—27)

This invention relates to machines for mining operations such as cutting longwall faces, thick or thin seams, cutting and loading rippings in gate roads, or cutting stable holes in underground mines, the stable holes referred to being those recesses at the ends of a longwall face in which cutting machines are located before and after making a journey along the face.

An object of the invention is to provide an improved machine for operations such as cutting stable holes.

According to the invention such a machine comprises a cutting unit having one or more cutter assemblies which cut from floor level to a higher level and moving to and fro along a conveyor unit to progress the cut material away from the cutter assembly or assemblies to a face conveyor or the like. One or more ploughs may be arranged to guide fallen coal on to the conveyor unit. Preferably there is a cutter assembly at each end of the cutting unit, the cutting unit being double-ended and symmetrical. Each cutter assembly may comprise one or more drums fitted with cutting picks, or a cutter assembly may comprise a number of cutting discs. In an advantageous construction a cutter assembly comprises two drums, one being above the arm or jib which carries it and one below the arm or jib; as described in our co-pending application Serial No. 674,058. The drums may be driven in any suitable manner, for example they may be mounted on one or more fixed shafts carried by the arm or arms, and may be driven by one or more electric, hydraulic, compressed air or turbo motors arranged inside one or more of the drums, or they may be driven as in the manner described in co-pending patent application Serial No. 674,058.

Further and optional features of the invention appear from the following description and claim.

Figure 1:
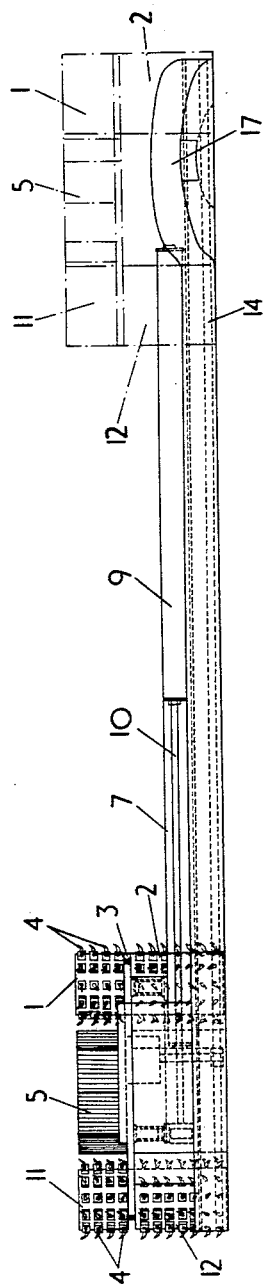
Figure 3:
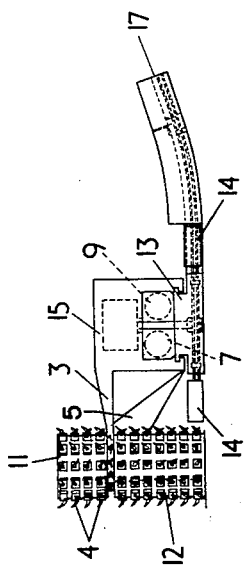
Figure 2:
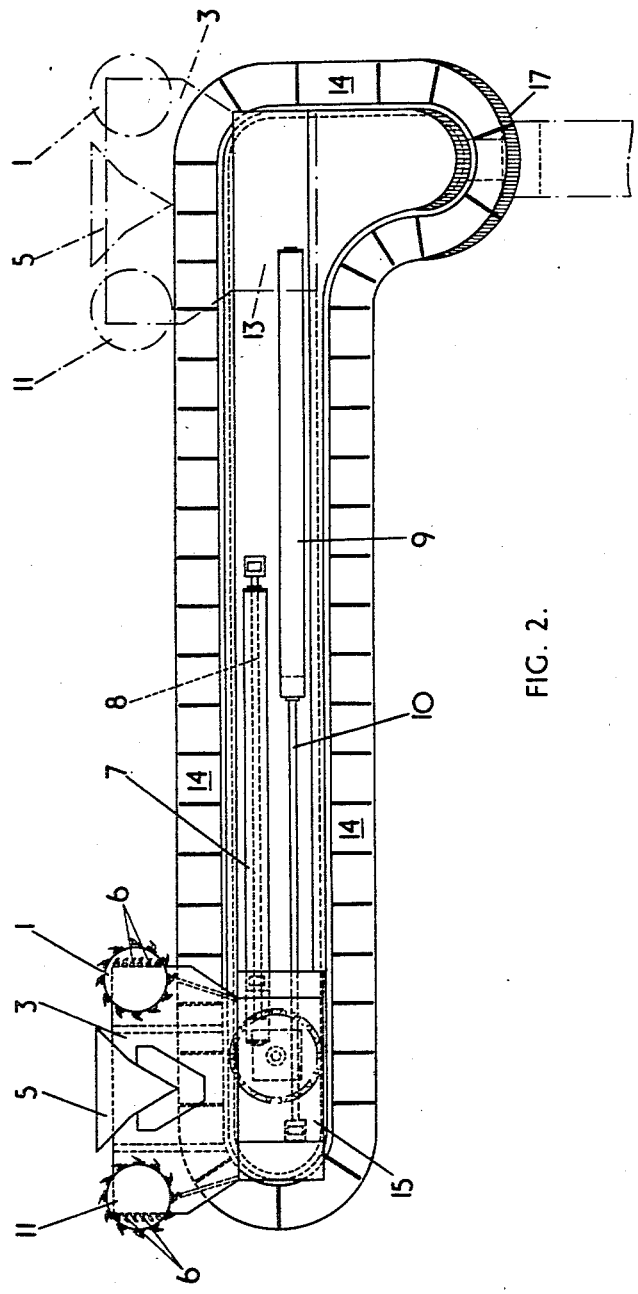
Figure 4:
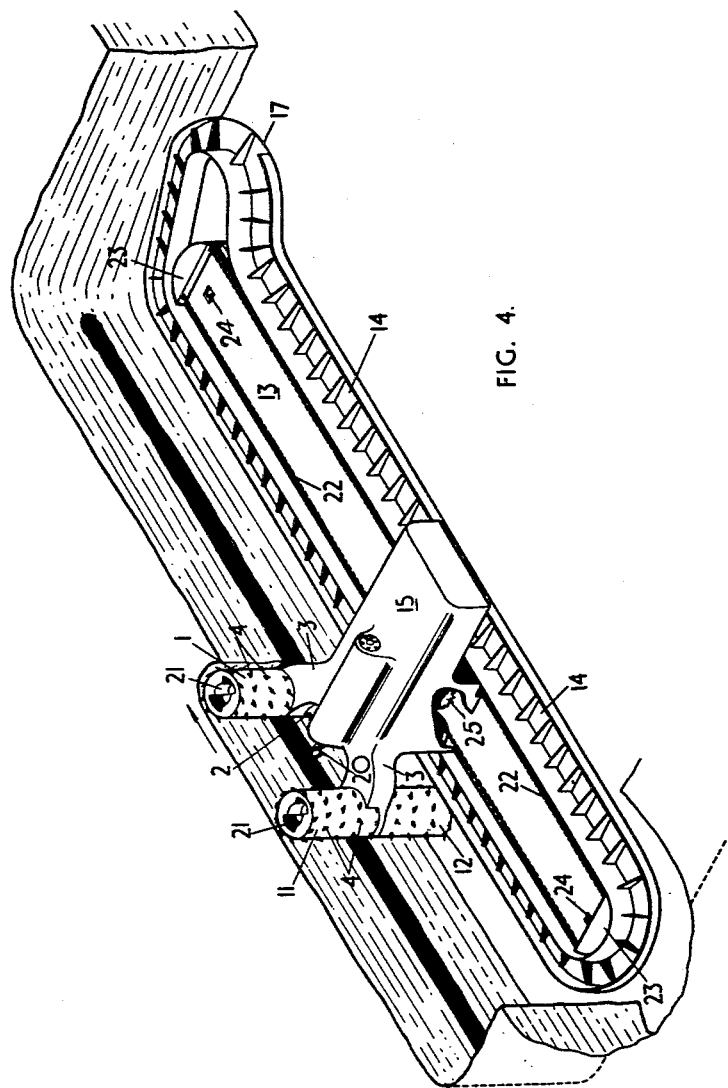

The invention is illustrated by way of example in the accompanying drawings in which:

Figures 1, 2 and 3 are respectively a side elevation, plan and an end elevation of one machine according to the invention, and Figure 4 is a perspective view of a modified machine according to the invention.

Each of the illustrated machines comprises a conveyor unit having an inner section 13 and an outer section 14 in the form of a scraper chain conveyor surrounding the inner section. Instead of a scraper chain conveyor of conventional construction there may be employed a single chain fitted with flights or vanes for moving cut coal. The conveyor has at a point 17 a raised portion with a discharge opening through which cut coal can be discharged on to a conveyor or any other desired coal transport device.

A cutting unit is mounted for movement to-and-fro along the inner section 13 of the conveyor unit. The cutting unit comprises a frame 15 which carries two support brackets or arms 3 supporting two cutter assemblies. One cutter assembly comprises two drums 1 and 2 and the other cutter assembly comprises two drums 11 and 12; the four drums are right cylindrical and rotate about vertical shafts fitted to the support arms 3 and are fitted with cutting picks 4. Motors and gearing are arranged inside the drums to drive them in any known manner, and if the motors are hydraulic they may be supplied by means of a pump driven by an electric or compressed air motor arranged within the frame 15.

Referring now to Figures 1 to 3, a plough 5 is secured to the support arm 3 and extends from floor level to roof level as do the cutter assemblies.

For moving the cutting unit to-and-fro two double-acting rams comprising a hydraulic cylinder 7 having a piston rod 8 and a hydraulic cylinder 9 having a piston rod 10 are secured to the inner section 13 of the conveyor unit. Commencing from the position shown in Figure 2, by applying hydraulic pressure to the cylinder 9 the piston rod 10 is retracted into the cylinder and draws along the cutting unit to which it is connected. When the cutting unit reaches the middle of the conveyor unit, the rod 10 is disconnected from the cutting unit and the rod 8 is connected thereto, then hydraulic pressure is supplied to the cylinder 7 to extend the rod 8 until the cutting unit reaches its extreme right-hand position shown in broken lines in Figures 1 and 2. The procedure is reversed to return the cutting unit to the initial position.

The plough 5 may be foldable or collapsible or detachable, and may be omitted or removed if desired.

Referring now to Figure 4, a horizontal pre-cutting unit or cutter bar 20 extends from the frame 15 and cuts a kerf in the face at the level of the arms 3.

The cutting drums 1 and 11 are provided with dog-tooth recesses 21 to receive complementary projections on other drums (not shown) so that by adding or removing drums it is possible to adjust the machine to suit the thickness of the seam.

Two fixed haulage chains 22 extend along the sides of the inner section 13 and are anchored to members 23 which can be moved by chain tensioning gear 24 to adjust the tension of the chains.

The frame 15 is caused to travel to-and-fro along the inner section 13 by means of a reversible sprocket 25 engaging the chains 22.

The machines illustrated in Figures 1 to 3 and in Figure 4 operate in a similar manner; when the cutting unit is travelling from left to right as viewed in Figures 2 and 4 the drums 1 and 2 and 11 and 12 rotate in the clockwise direction. The drums 1 and 2 tear down coal and fling it on to the conveyor 14; any coal which falls to the floor is thrown towards the conveyor by the drums 11 and 12. As the cutting unit travels back in the reverse direction the direction of rotation of the drums is anti-clockwise as viewed in plan and the cutting and loading section is as before. The cutting unit travelling backwards and forwards cuts a stable hole of the required length from floor level to roof level, and the machine is advanced into the stable hole by any suitable means, for example it may be provided with hydraulic rams, or it may be connected to self-advancing hydraulic roof supports.

I claim:

In a mining machine comprising a conveyor unit and a cutter unit, wherein said conveyor unit comprises an inner section encircled by a flight-conveyor and said cutter unit travels to-and-fro along said inner section, the provision on said cutter unit of two symmetrically-arranged cutter assemblies of cutter drums which rotate about vertical axes and cut up to roof level and down to floor level and are reversible in their directions of rotation so that in either direction of travel of said cutter unit said cutter drums of the leading one of said cutter assemblies cut and throw material towards said flight-conveyor and the lower of said cutter drums of the trailing one of said cutter assemblies throws fallen material towards said flight conveyor, said cutter assemblies being spaced so that material is cut away to allow movement of said flight conveyor into the track cut by said cutter assemblies.

References Cited in the file of this patent

UNITED STATES PATENTS

| | | |
|---|---|---|
| 1,500,352 | Walker | July 8, 1924 |
| 2,394,194 | McCarthy | Feb. 5, 1946 |
| 2,592,358 | Tutwiler | Apr. 8, 1952 |
| 2,730,346 | Joy | Jan. 10, 1956 |

FOREIGN PATENTS

| | | |
|---|---|---|
| 709,538 | Great Britain | May 26, 1954 |
| 730,659 | Great Britain | May 25, 1955 |
| 592,754 | Germany | Feb. 14, 1934 |
| 877,735 | Germany | May 26, 1953 |
| 890,336 | Germany | Sept. 28, 1953 |